W. ROGERS.
WHEEL.
APPLICATION FILED JAN. 4, 1911.

1,043,144.

Patented Nov. 5, 1912.

Witnesses
Edwin F. McKee
E. Edmonston Jr.

Inventor
Wiley Rogers
By Victor J. Evans
Attorney

UNITED STATES PATENT OFFICE.

WILEY ROGERS, OF FORT PAYNE, ALABAMA, ASSIGNOR OF ONE-HALF TO GEORGE W. ROGERS, OF MENLO, GEORGIA.

WHEEL.

1,043,144.  Specification of Letters Patent.  Patented Nov. 5, 1912.

Application filed January 4, 1911. Serial No. 600,774.

*To all whom it may concern:*

Be it known that I, WILEY ROGERS, a citizen of the United States, residing at Fort Payne, in the county of Dekalb and State of Alabama, have invented new and useful Improvements in Wheels, of which the following is a specification.

This invention relates to wheels and more particularly to the hubs thereof.

The object of the invention is the provision of a simple, efficient and cheaply constructed hub which will take up all shocks imparted to the wheel without conveying them to the running gear of the vehicle.

A further object of the invention is the provision of a spring hub which will take the place of the present pneumatic tire wheel and in which the tension of the springs used may be adjusted to accommodate the wheel to vehicles of different weights.

Further objects of the invention will appear as the following specific description is read in connection with the accompanying drawings, which form a part of this application, and in which:—

Figure 1:
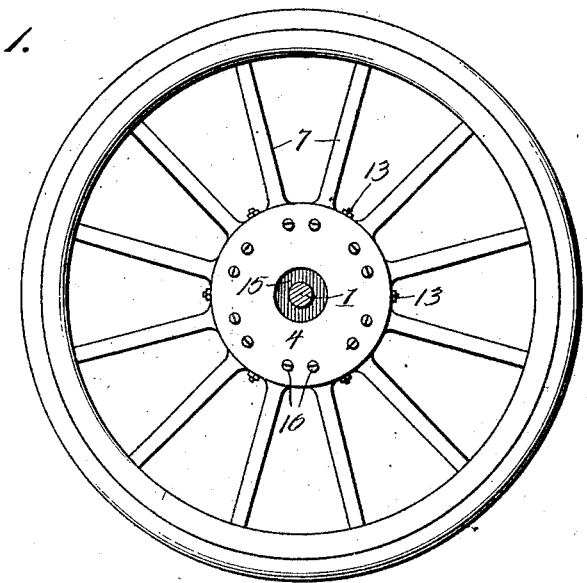
Figure 2:
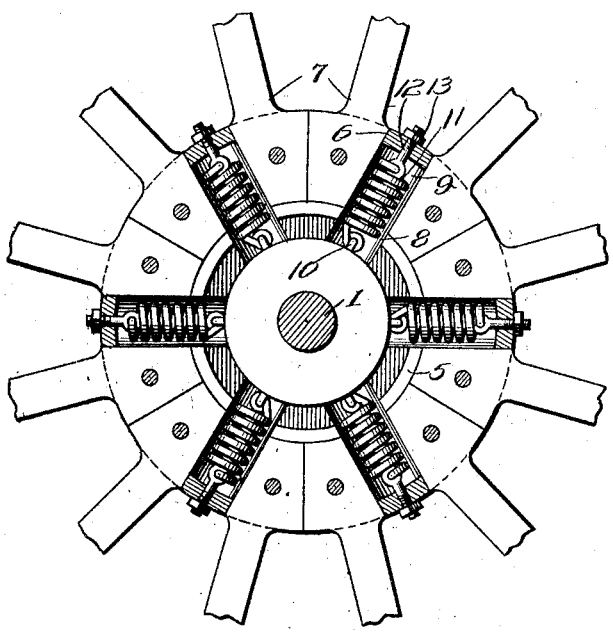
Figure 3:
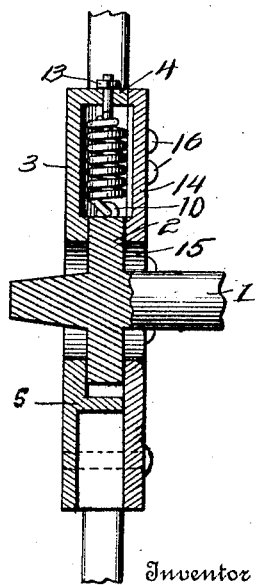

Figure 1 is an elevation of the wheel embodying my invention. Fig. 2 is a detailed elevation with the front plate removed. Fig. 3 is a detailed sectional view.

Referring to the drawings, 1 represents the axle of a vehicle which has secured thereto an annular disk or flange 2.

3 represents the hub proper which comprises a centrally apertured plate or body having a pair of concentric circular flanges 4 and 5, the former of which is notched, as at 6, to permit the passage of the spokes 7 whose inner ends rest upon the latter flange 5. The flange 5 is notched at 8 and the body is grooved at 9 to permit the passage of connecting springs which are bridged between the periphery of the disk and the flange 4. Suitable eyes 10 project from the periphery of the disk 2 and form a connection for the inner end of the springs 11. The outer end of the springs has connected thereto the adjusting bolts 12 which pass through the flange 4 and have the adjusting nuts 13 mounted upon their outer ends in a convenient position to be engaged without removing any parts.

A front skeleton plate 14 having a central enlarged aperture 15 for the passage of the axle 1 is secured to the body 3 by means of the screws 16 which pass through the front plate and the spokes and are threaded into the body 3. This front plate serves to provide a dust-proof cover for the springs and at the same time prevents lateral movement of the wheel upon the axle and also serves to hold the spokes in place.

Having thus described the invention, what I claim as new is:—

In combination, an axle provided with a solid circular disk, a wheel having a hub comprising a centrally apertured plate or body provided with radially arranged grooves and having outer and inner notched concentric circular flanges, a felly, spokes connecting the hub to the felly, said spokes passing through the outer notched concentric circular flange and having their lower ends resting on the said inner flange, springs disposed within the said radially arranged grooves and having their inner ends extended through the inner notched circular flange and connected with the eyes on the periphery of the circular disk, the outer end of said springs being connected with an adjustable eye bolt which extends through the said outer flange, bridging the said spring between the periphery of the said disk and the said outer circular flange, a skeleton plate having a central aperture surrounding the axle and secured to the former mentioned plate or body portion, the said plate and skeleton plate being adapted to contact with the opposite face portions of the said solid circular disk adjacent the peripheral edge thereof, thereby preventing any accidental lateral movement of the wheel on the axle, the said plates also serving as a guide member for the said solid circular disk of the axle.

In testimony whereof I affix my signature in presence of two witnesses.

WILEY ROGERS.

Witnesses:
 H. W. BARNES,
 B. L. ALLEN.